United States Patent

Gray

[11] 4,225,196
[45] Sep. 30, 1980

[54] HYDRODYNAMIC COMPLIANT THRUST BEARING

[75] Inventor: Stanley Gray, Skaneateles, N.Y.

[73] Assignee: Mechanical Technology Incorporated, Latham, N.Y.

[21] Appl. No.: 974,259

[22] Filed: Dec. 29, 1978

[51] Int. Cl.³ .................... F16C 32/06; F16C 39/04
[52] U.S. Cl. ............................. 308/9; 308/160; 308/DIG. 1
[58] Field of Search ............... 308/9, 26, 36.3, 160, 308/168, DIG. 1

[56] References Cited

U.S. PATENT DOCUMENTS

| | | | |
|---|---|---|---|
| 3,382,014 | 5/1968 | Marley | 308/9 |
| 3,809,443 | 5/1974 | Cherubim | 308/9 |
| 4,082,375 | 4/1978 | Fortmann | 308/9 |

*Primary Examiner*—Richard R. Stearns
*Attorney, Agent, or Firm*—Joseph V. Claeys; John M. Neary

[57] ABSTRACT

A resilient compliant hydrodynamic fluid film thrust bearing includes a top bearing sheet of thin metalic foil material, and a lower supporting sheet of the same or slightly heavier gauge material. The top bearing sheet is stamped to produce an annular array of truncated sector-shaped flaps attached to the array along one radially extending edge. The second section is stamped to produce an annular pattern of raised projections formed by bending the material along slits to form radially extending bumps which resiliently support the first section. The two sheets are superimposed and aligned, and are welded together along the edge by which the sector-shaped flaps are attached to the first section. The welded assemblies are then sheared from the superimposed foils and deburred.

8 Claims, 5 Drawing Figures

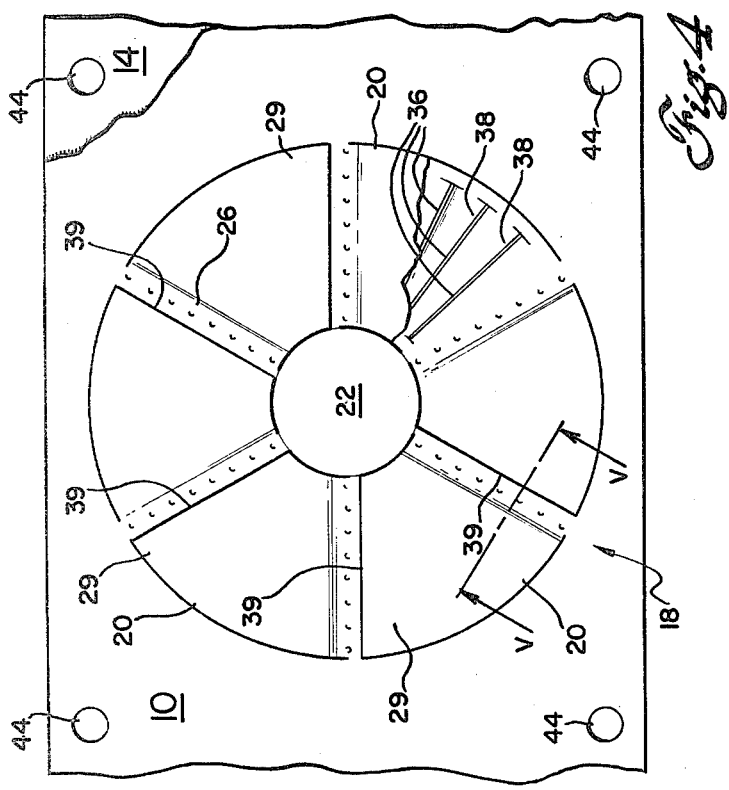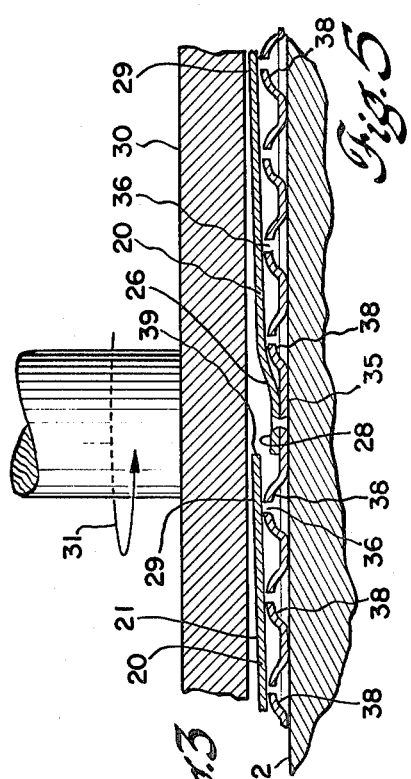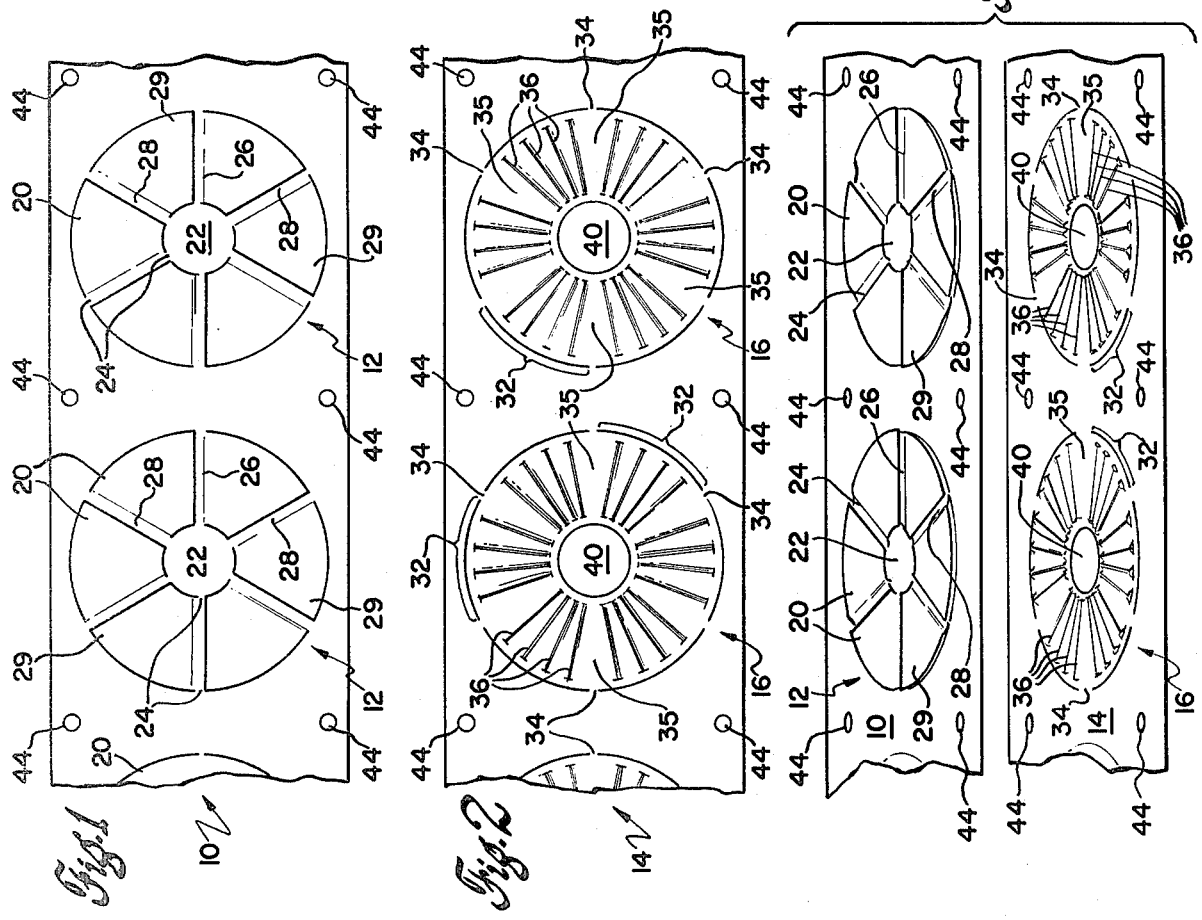

HYDRODYNAMIC COMPLIANT THRUST BEARING

BACKGROUND OF THE INVENTION

Compliant hydrodynamic fluid film bearings have been proven in use to provide extremely low friction durable, reliable support for ultra-high speed rotors in the most hostile environments, such as very low or very high temperatures, in which conventional lubrication fails. These applications are generally custom designed for small volume uses and they have usually been correspondingly expensive. For this reason, bearings of this class have acquired a reputation in the art as ultra-sophisticated, high technology products which are not suitable for ordinary consumer products wherein cost is a major consideration.

Although the ultra-high speed and hostile environment capabilities of the hydrodynamic fluid bearings have made the sophisticated applications an important field of use, I believe that the true potential for bearings of this nature will ultimately be in ordinary industrial, automotive and consumer products. I have designed processes for production of compliant hydrodynamic fluid film bearings to make high volume production of these bearings extremely economical, even more so than conventional bearings.

SUMMARY OF THE INVENTION

A compliant hydrodynamic thrust bearing includes a thin, flexible bearing sheet supported on a compliant support element that deflects and permits the bearing sheet to deflect and conform to the bearing surface of the thrust runner where it deviates during operation from true parallelism with the thrust plate, under the influence of thermal distortion or runout caused by externally applied loads or rotor imbalance.

The operation of a compliant hydrodynamic fluid film thrust bearing is based on the generation of a supporting fluid film in the gap between the thrust runner and the bearing sheet. This occurs because the boundary layer of fluid adjacent to the rotating thrust runner is drawn into the gap, which is slightly wedge-shaped, tapering in the direction of thrust runner rotation. The fluid film in the wedge-shaped gap builds in pressure toward the trailing edge of the gap, thereby providing a thin pressurized supporting cushion of fluid between the bearing sheet and the thrust runner.

The support member is made more compliant than the fluid film so that the support member will deflect under transient excursions of the thrust runner before the fluid film is breached. The support member should be able to deflect locally without causing changes in the elevation of its other portions, which could raise the bearing sheet in those other portions and create "hot spots" or local areas on the bearing sheet when the pressure exceeds the load carrying capacity of the fluid film and the bearing sheet contacts the thrust runner. This can result in a hole burned instantaneously through the bearing sheet, with detrimental consequences to the load carrying capacity of the bearing.

Accordingly, it is an object of this invention to provide a compliant hydrodynamic fluid film thrust bearing which permits the bearing sheet to deflect locally without affecting its elevation elsewhere. This bearing is also extremely economical to produce in great numbers and provides the advantages of hydrodynamic fluid film thrust bearings, viz. low friction, durability, ultra-high speed, and reliable operation. The tooling for manufacturing the bearing according to this invention is not of such high cost that it constitutes a significant capital investment, so a reasonable investment can produce tooling for an entire line of bearings from very small to very large. Another object of this invention is to provide a method of economically manufacturing a compliant hydrodynamic fluid film thrust bearing in great quantities. This method enables the same tooling to be used for manufacturing an entire family of bearings having different characteristics, and assures the exact alignment and circularity of the bearing sections.

The invention contemplates a method for producing a bearing assembly, and the bearing assembly itself, fabricated from two strips of metal. Using punch and die techniques in a standard automatic press, a circular pattern of truncated sector-shaped flaps or pads is stamped into the first strip leaving a vane along one radial edge of the flap by which it remains attached to (i.e. unsevered from), the strip. The second strip has an annular formation of radial slits stamped therein, and the material on the edges of the slits is bent away from the plane of the strip to form radially extending resilient bump projections. The slits are arranged in a plurality of clusters separated by solid zones. The two strips are then superimposed with the circular patterns, the pads, and the vanes in the first strip aligned with the circular patterns, the clusters of slits, and the solid zones, respectively, in the second strip. The vane and the solid zone are then spot or seam welded and the welded assembly is sheared from the superimposed strips.

DESCRIPTION OF THE DRAWINGS

These and other objects of the invention and the invention itself will be more clearly understood upon reading the attached description of the preferred embodiment in conjunction with an examination of the appended drawings, wherein FIG. 1 is a plan view of a bearing surface strip made according to this invention;

FIG. 2 is a plan view of a resilient support strip made according to this invention;

FIG. 3 is a perspective exploded view showing the two strips of FIGS. 1 and 2 aligned and ready to be superimposed;

FIG. 4 is a plan view of the superimposed and welded strips shown in FIGS. 1 and 2 prior to shearing from the strip;

FIG. 5 is an elevation taken along lines V—V in FIG. 4.

DESCRIPTION OF THE PREFERRED EMBODIMENT

Referring now to the drawings wherein like reference characters designate identical or corresponding parts, and particularly to FIG. 1 thereof, a metal strip 10 is shown having a plurality of circular sections 12 stamped therein. A second metal strip 14, shown in FIG. 2 has a plurality of sections 16 stamped therein corresponding in dimension to the sections 12 in strip 10. After the sections 12 and 16 are stamped in the strips 10 and 14, the strips are superimposed and aligned as shown in FIG. 3 and are spot or seam welded together in the manner shown in FIG. 4 to produce a series of bearing assemblies 18 which are then sheared from the superimposed sheets 12 and 14 as finished thrust bearing assemblies.

Referring again to FIG. 1, the strip 10, which may be of materials such as stainless steel or Inconel, is passed through a metal punch press (not shown) which includes correspondingly shaped punch and die members to shear the outline of a plurality of truncated sector-shaped flaps or pads 20 (six being shown) in the metal strip 10. This operation produces six truncated sector-shaped pads, each having an upwardly facing bearing surface 21. The pads are sheared on three sides and attached to the sheet by small retention tabs 24 at the inner and outer circumferential edges of the pads 20.

In the same operation in which the section 12 is stamped in the sheet 10, the pads 20 are slightly bent at a predetermined radial bend 26 so that the flaps protrude or extend from the sheet 10 in the manner shown in FIGS. 3 and 5. The radial vane 28 between the bend line 26 and the adjacent radial edge of the pad 20 remains in the plane of the sheet 10 and constitutes a weld strip along which the section 12 is welded to the section 16, as shown in FIGS. 4 and 5. The bend line 26 is the leading edge of a ramp 29 for the pad 20 which is productive of the hydrodynamic supporting fluid wedge which is generated over each pad 20 by the relative movement of a thrust runner 30 moving clockwise as shown by the arrow 31 in FIG. 5 over the bearing assembly 18, as discussed below.

Referring now to FIG. 2 the strip 14 which may be of the same material as the strip 10, or of slightly thicker gauge, is passed through a separate metal punch press. In this operation the outline of the resilient support sections 16 are sheared, and the slits 36 are sheared, although the slits may be sheared in a separate operation. This produces a series of areas 32 separated by retention tabs 34 which retain the stamped section 16 in the strip 14 until it is to be removed. Each tab 34 coincides with the outer end of a radial vane 35 which separates the areas 32 and constitutes a weld strip to which a respective vane 28 on strip 10 is later welded. The support areas 32 each include a cluster of slits 36 which extend radially in the annular section 16. When the slits are formed, the material adjacent slit 36 is deformed away from the plane of the strip 14 in the form of a raised projection or split bump 38 shown in FIGS. 3 and 5. The two longitudinal portions on each side of the slit 36 can deflect independently of each other and the rest of the section 16 so that, in operation, deflection of the bump or bumps in one area of the section 16 will not cause elevations or other changes in any other part of the section 16. The height of the bumps 38 can be graduated from low height adjacent the leading edge 26 of the pad, and gradually increasing in height toward the last bump in area 32. This arrangement facilitates the inclined orientation of the pads 20 when they are welded to the weld vane 35 between the areas 32 to facilitate the generation of load-supporting hydrodynamic fluid wedges. The center plug can be punched out of the section 16 during the initial shearing operation, leaving a circular hole 40.

After the two strips have been sheared in the manner indicated above, while the sections 12 and 16 are still in the strips 10 and 14 and before welding, they may be heat treated in a furnace, in a known manner, for hardening and resilience, and coated with anti-friction coating such as molybdenum disulfide, Teflon or "HL-800" a proprietary anti-friction coating of Mechanical Technology Incorporated of Latham, N.Y. HL-800 is a hard thin coating of a graphite and cadmium oxide mixture in a ceramic matrix that provides good anti-friction characteristics at high temperature. Its functions and method of application are disclosed in the co-pending application Ser. No. 974,264 entitled "High Temperature Low Friction Surface Coating" of Bharat Bhushan, filed concurrently herewith the disclosure of which is hereby incorporated by reference. The coating of anti-friction material on the bearing surfaces 21 of the first strip 10 is best accomplished by superimposing a mask on the zone 12 which covers everything but the truncated sector-shaped pads 20. The radial vane 28 is also covered to facilitate welding in the next step.

The strip 10 and the strip 14, after shearing, heat treating, and coating with anti-friction material, are superimposed and aligned with the use of alignment apertures 44. These apertures may also be used to insure that the patterns 12 and 16 are accurately stamped on the strips 10 and 14. The alignment automatically positions the pads 20 over their respective clusters of bumps 38 and aligns the weld vanes 24 of sections 12 over the weld vanes 35 on sections 16. The welding is accomplished by a welding jig which produces a series of spot welds in radial patterns along the weld vanes 24 and 35 as shown in FIG. 5, or seam welds a continuous weld line along these vanes. The welding operation can be followed immediately by, or by simultaneous with, the next operation which is to shear the welded assembly of sections 12 and 16 from the strips 10 and 14.

The welded assembly, shown in FIGS. 4 and 5, may have shear burrs on the edges of the pad 20 and on the circumferential edges of the section 16. The burrs on the pad 20 face downwardly and lie radially and angularly beyond the supporting bumps 38, so that these burrs do not interfere with the operation of the thrust bearing. The burrs on the slits 36 can be made to be on the underside of the bumps, and therefore not interfere with the interaction between the pads 20 and the bumps 38. The burrs on the outer and inner circumferential edges of the section 16 would also face downwardly and might interfere with the seating of the bearing assembly on the thrust plate 42. Therefore it might be desirable to process the bearing assembly 18 through a polishing machine to remove the burrs on the lower face of the assembly.

An automated continuous operation to manufacture the bearing disclosed herein can be accomplished with three punch presses, an automatic welding machine and a heat treatment furnace. The strips 10 and 14 can be processed simultaneously in two parallel lines by two punch presses and the strips, still in the form of strips, can be passed into the welding machine where they are aligned and welded along the vanes 28 and 35. The superimposed and welded strips 10 and 14 are then passed to the third press which, also utilizing the aligning apertures 44, shears the bearing assemblies from the sheets 10 and 14. The bearing assemblies can then be heat treated and coated, as described previously.

Since very little material is sheared in the final step, namely, the retention tabs 24 and 34, the bearing assembly 18 is subjected to very little force and therefore is not subjected to damage by the final shearing step. Moreover, the final shearing step need include only shearing points at the six angular locations around the bearing assembly 18, and these locations are at the weld ribs 28 and 35, which are between the aligned pads 20 and supporting bump clusters 32. Therefore the areas of the bearing assembly 18 which could otherwise be damaged by a shearing step after the sections 12 and 16 are welded together are not damaged because these delicate areas are not subject to shear forces.

A typical bearing to be manufactured by the disclosed process employs Inconel X-750 sheet metal, typically 0.003-0.004 inches thick and, after heat treating, having a hardness of approximately 50 Rockwell C. The outside diameter of the bearing is approximately 1.5 inches and six bearing pads are provided in this example.

The disclosed method reliably and consistently produces bearings which are perfectly circular and whose pads 20 and support zones 32 are precisely aligned angularly and radially, and does so with significant production economics. The tooling which is used to fabricate the disclosed bearing can be used on materials other than the materials disclosed. For example, in an application in which the thrust loads will be greater than those intended to be borne by the disclosed embodiment, material of greater thickness and strength can be employed to provide stiffer support zones 32 and stiffer pads 20. In addition, the presses and welding machine setup can be employed with different size punches to enable the production process to run continuously. That is, after a bearing of particular size and stiffness is produced in sufficient quantity to satisfy the demand for a period of time, the presses may be provided with punches and dies of a different size and spacing, and the welding machine electrodes may be repositioned, so that thrust bearings of a different dimension may be fabricated using the same presses and welding machine. The capital investment for the presses and welding machine is not high considering that a complete line of bearings of this design of different diameters and stiffnesses can be produced from this tooling. In addition, the same presses could be utilized to fabricate, from the same metal strips, bearings of the design disclosed in my co-pending application Ser. No. 974,254 entitled "Modular Compliant Hydrodynamic Bearing with Overlapping Bearing Sheet" filed concurrently herewith.

The method disclosed herein is so uncomplicated and is so conducive to precision operation that the bearing assemblies produced can be held within very narrow tolerance limits. It is thus possible to produce a high precision bearing in a fully automated process productive of very few, if any, defective bearings, and using a production line requiring relatively small capital investment. It produces a convenient, inexpensive welded assembly which is easily handled and inspected and which can be easily mounted onto a product by clamping, welding, cement, and/or automatic assembly technique.

Obviously, numerous modifications and variations of the disclosed embodiment of the invention are possible in light of this disclosure. For example, the radial slits 36 could be separated by other radial slits which extend only across the order half of the radius of the section 16 to help equalize the stiffness of the support zones 32 in the radial direction. It is to be expressly understood, therefore, that these and other modifications are to be considered as part of my invention which is defined by the spirit and scope of the appended claims, wherein

I claim:

1. A compliant hydrodynamic fluid film thrust bearing for positioning within a gap defined between the opposed surfaces of a thrust plate and a relatively rotating thrust runner, and fastening to said thrust plate, comprising:
   (a) a first annular section having a plurality of angularly adjacent, truncated, sector-shaped pads of thin, flexible sheet metal, each attached to the bearing along one radial edge portion, said radial edge portion being the leading edge with respect to the direction of rotation of the thrust runner, and
   (b) a second annular section underlying and supporting said first annular section, and having a plurality of slits, each slit forming at least one edge of a resilient projection elevated above the plane of said second annular section, said slits being distributed around said second section in a plurality of angularly spaced clusters which are angularly aligned with said sector-shaped pads to provide resilient support for said pads.

2. The bearing defined in claim 1, wherein said projections are radially elongated and said angular spacing of said clusters provides radial vanes therebetween, along which vanes said radial edge portions of said pads are attached.

3. The bearing defined in claim 2, wherein said slits run longitudinally along the crest of said projections.

4. The bearing defined in claim 1, where said projections in each of said clusters increase in height from the projection nearest said radial edge portion of the respective pad over said cluster toward the projection nearest the angularly remote edge of said pad.

5. The bearing defined in claim 1, wherein each of said projections is compliant independently of the other projections and the other portions of said second section.

6. The bearing defined in claim 5, wherein said projections are more compliant than the fluid film generated over said bearing by rotation of said thrust runner.

7. The bearing defined in claim 6, wherein said projections each extend radially along said second section, said pads being supported for substantially their entire radial extent by said projections.

8. The bearing defined in claim 7, wherein said projections in each of said clusters increase in height from the projection nearest said radial edge portion of the respective pad over said cluster toward the projection nearest the angularly remote edge of said pad.

* * * * *